United States Patent
Hammer

[11] Patent Number: 5,971,284
[45] Date of Patent: Oct. 26, 1999

[54] APPARATUS FOR REGULATING HEATER CYCLES TO IMPROVE FORCED-AIR HEATING SYSTEM EFFICIENCY

[75] Inventor: Jack Hammer, Wantagh, N.Y.

[73] Assignees: Intellidyne, LLC, Wantagh; Harvey Schwartz, Merrick, both of N.Y.

[21] Appl. No.: 09/080,373

[22] Filed: Mar. 25, 1998

Related U.S. Application Data

[60] Provisional application No. 60/041,693, Mar. 25, 1997.

[51] Int. Cl.[6] .................................................. F23N 1/00
[52] U.S. Cl. .......................... 236/11; 236/10; 236/46 E; 236/46 F; 236/15 BB; 165/267; 165/268; 165/269
[58] Field of Search ................................ 236/11, 10, 46 F, 236/46 E, 15 BB; 165/267, 268, 269

[56] References Cited

U.S. PATENT DOCUMENTS

| | | | |
|---|---|---|---|
| 3,126,154 | 3/1964 | Shoalts | 236/9 |
| 4,090,663 | 5/1978 | Bonne et al. | |
| 4,136,730 | 1/1979 | Kinsey | |
| 4,199,023 | 4/1980 | Phillips | |
| 4,408,711 | 10/1983 | Levine | 236/11 |
| 4,410,132 | 10/1983 | Levine | 236/11 |
| 4,725,001 | 2/1988 | Carney et al. | |
| 4,938,684 | 7/1990 | Karl et al. | |
| 5,244,146 | 9/1993 | Jefferson et al. | |
| 5,248,083 | 9/1993 | Adams et al. | |
| 5,297,729 | 3/1994 | Scullion | |
| 5,307,990 | 5/1994 | Adams et al. | |
| 5,326,026 | 7/1994 | Jefferson et al. | |
| 5,377,909 | 1/1995 | Kirkpatrick | |

*Primary Examiner*—Henry Bennett
*Assistant Examiner*—Marc Norman
*Attorney, Agent, or Firm*—Nolte, Nolte & Hunter

[57] ABSTRACT

A method and apparatus of regulating cycles of a burner in a forced air heating system. A control unit uses a sensor at an output of a heat exchanger to make measurements of a temperature of air output from the heat exchanger. The control unit observes temperature measurements, after the burner has turned on. It initializes a confirmation interval when two consecutive temperature measurements are the same. If the temperature is the same at an end of the confirmation interval. The invention interrupts firing of the burner for an interrupt interval. The interrupt interval is insufficient to allow the heat exchanger to cool below a temperature useful for heating below which the circulation fan would shut off.

21 Claims, 4 Drawing Sheets

TYPICAL FURNACE BURNER CIRCUIT

APPARATUS FOR REGULATING HEATER CYCLES TO IMPROVE FORCED-AIR HEATING SYSTEM EFFICIENCY

This application claims the benefit of U.S. Provisional Application No. 60/041,693, filed Mar. 25, 1997.

FIELD OF THE INVENTION

The invention relates in general to devices that consume fossil fuels (gas/oil) in the process of generating a heating medium (air) used for the purposes of heating an area requiring a temperature controlled environment (space).

It is the purpose of this invention to reduce the fuel consumption of the heating system responsible for the generation of the heating media that is being distributed throughout the space to be heated. This reduction of fuel must be accomplished without the undesirable side effect of causing temperature fluctuations, within the controlled environment beyond those which existed before the installation of the invention.

BACKGROUND OF INVENTION

Forced air heating systems utilizing gas or oil fired burners as a means of heating the heating media (air) are usually comprised of the following components:

a) Thermostat; which senses the temperature within the desired space and activates the furnace's burner.

b) Burner; which generates a flame and hot-gases.

c) Heat-exchanger; the device used to transfer the flame and hot-gas temperatures to the heating media (air).

d) Heating media distribution means; usually ductwork.

e) Circulating Fan; used to force the heating media through the distribution means.

f) Items within the controlled environment having thermal mass and inertia.

A typical residential forced air heating system is usually controlled in the following manner:

When there is a need for heat within the space, the space thermostat calls for heat directly energizing the burner. Once a certain temperature is reached within the furnace's heat exchanger, the air-circulation fan is started independently using it's own built-in thermostat. The air-circulation fan forces the heating media through the distribution means and causes a heat increase within the controlled space. When the desired space temperature setpoint is reached, the space thermostat de-energizes the burner. The air-circulation fan continues to run until the temperature within the heat exchanger drops to a certain temperature (as set via the units built-in heat exchanger thermostat). The above control scheme is repeated over and over again as a means of controlling the space temperature. In a typical commercial (roof-top furnace) application, the air-circulation fan may run continuously.

In connection with heating systems, it is common knowledge that the output capacities of heating systems are usually determined by:

a) The worst case scenarios (design-loads) that the systems are expected to encounter.

b) Square footage and other architectural considerations of the facility.

c) Anticipated future expansions.

d) Expected degradation of the system output due to aging.

Anytime the demand on the heating system is less than the heating capacity of the system, the heating system is over-sized. This over-sizing condition exists, within a typical properly designed system, about 85% of the time and causes the heating system to cycle the burner as the means of controlling the temperatures within the desired space.

Experimentation has shown that the temperature of the air being discharged from the furnace has a terminal (maximum) temperature that is reached, regardless of how long the burner is firing for. This terminal temperature is reached whenever the furnace is being utilized at less than maximum design load and is caused by the inability of the heat exchanger to transfer the total heat generated by the flame and hot gases to the heating media. This inability of the heat exchanger is partially due to inefficiencies of the heat exchanger itself, and partially due to the inability of the heating media to absorb all of the heat that the burner is capable of generating. Keeping the burner firing during this terminal temperature period is not productive and wasteful because the heat that is not absorbed by the heating media is expelled as hot gases, usually through the flue system.

Experimentation has also proven that additional thermal energy is available in the heat exchanger itself. This energy can be utilized during the relatively brief off period of the burner (generated by the invention) to maintain adequate heating discharge air temperatures.

Fuel savings are achieved, while maintaining the same space temperature conditions, by intelligently cycling the burner about this "terminal temperature", and by utilizing the additional heat available for extraction from the heat exchanger.

The thermal inertia and thermal storage of the items within the controlled space are used as a capacitor, of sorts, to absorb any short-term thermal transitions.

It has also been shown experimentally that while cycling the burner about the terminal temperature of the heat exchanger does lead to fuel reduction, it is necessary for the invention to not allow the discharge air temperature to drop too low. Too low, is the point at which there would be insufficient heat energy available to provide heating for the space and/or the point at which the air circulator fan would undesirably stop during a heating call. The invention described herein will not allow this to happen by cause of the invention.

OBJECTS OF THE INVENTION

The present invention seeks to reduce the fuel consumption of forced air (furnace) heating systems by modifying and controlling burner cycling. It is important to note that the invention works in conjunction with the heating system's control device (thermostat), and can not cause the burner to fire unless there is a specific call to do so, by the heating system's control device.

The invention is able to determine the terminal temperature of the heat exchanger and the load imposed on the heating system. This data is used by the invention's computer program to modify the cycling of the burner in order to make the most efficient use of the fuel being converted into thermal energy.

This is accomplished, by sensing the temperature of the discharge air with a sensor provided with, and an integral part of, the invention. The temperature information is processed by the computer program residing within the invention and indirectly causes all modifications of burner cycling. The invention has the capability of determining the terminal temperature of the heat exchanger and then based upon the time taken to achieve this terminal temperature, on a burner cycle by cycle basis, determine the load upon the heating system. When the load upon the system is determined, the amount of temperature drop allowed by the invention will also vary from burner-cycle to cycle to achieve the most desirable and efficient manner in which to control the burner.

It is therefore desirable for the invention to be an energy saving device capable of being used in residential, commercial and industrial (thermostat) demand type control systems. This invention would be suitable for new, retrofit and original equipment manufacturer (OEM) installations. It is also the inventions intent to be simple to install and not require any programming or adjustments.

DETAILED DESCRIPTION OF THE DRAWINGS

Conventional

Figure 1:
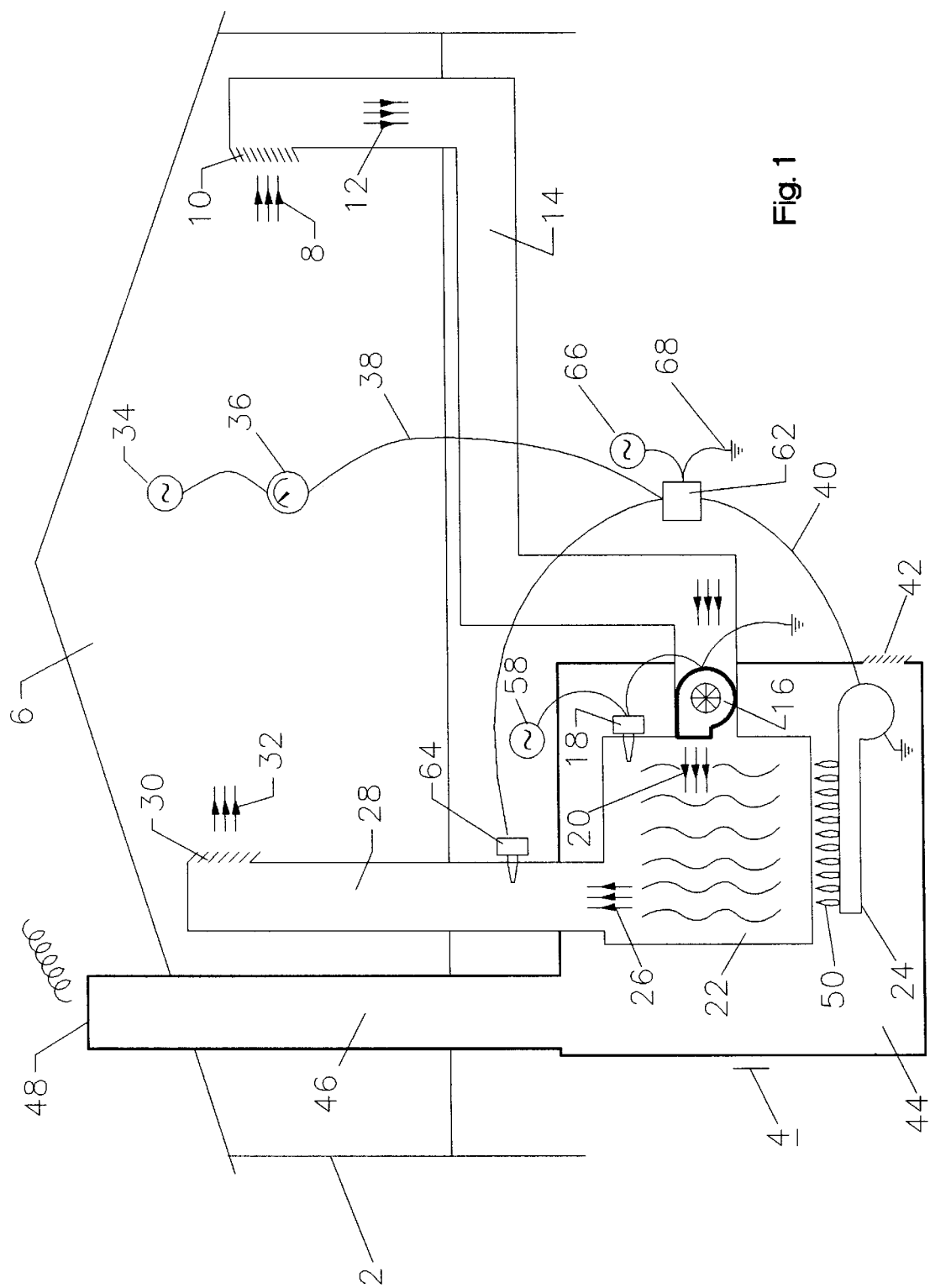
FIG. 1 is a system diagram showing the invention in a typical forced air (furnace) heating system.

FIG. 1, shows a home 2, heated by a forced-air heating system, generally designated 4, heating space 6. Conventional elements of the forced-air heating system 4 include an air intake 10, through which air 8 and 12 is sucked into intake duct 14, by circulating fan or blower 16. In commercial installations or buildings where ventilation is an important factor, fan 16 may always be running, but in this home installation fan 16 is actuated by heat exchange thermostat 18. Air 20 is exhausted by fan 16 into heat exchanger 22, where burner 24 heats the heat exchanger 22, and air 20 is forced by pressure as output air 26 through output duct 28 through output vent 30, until the air 32 is vented into space 6.

Figure 4:
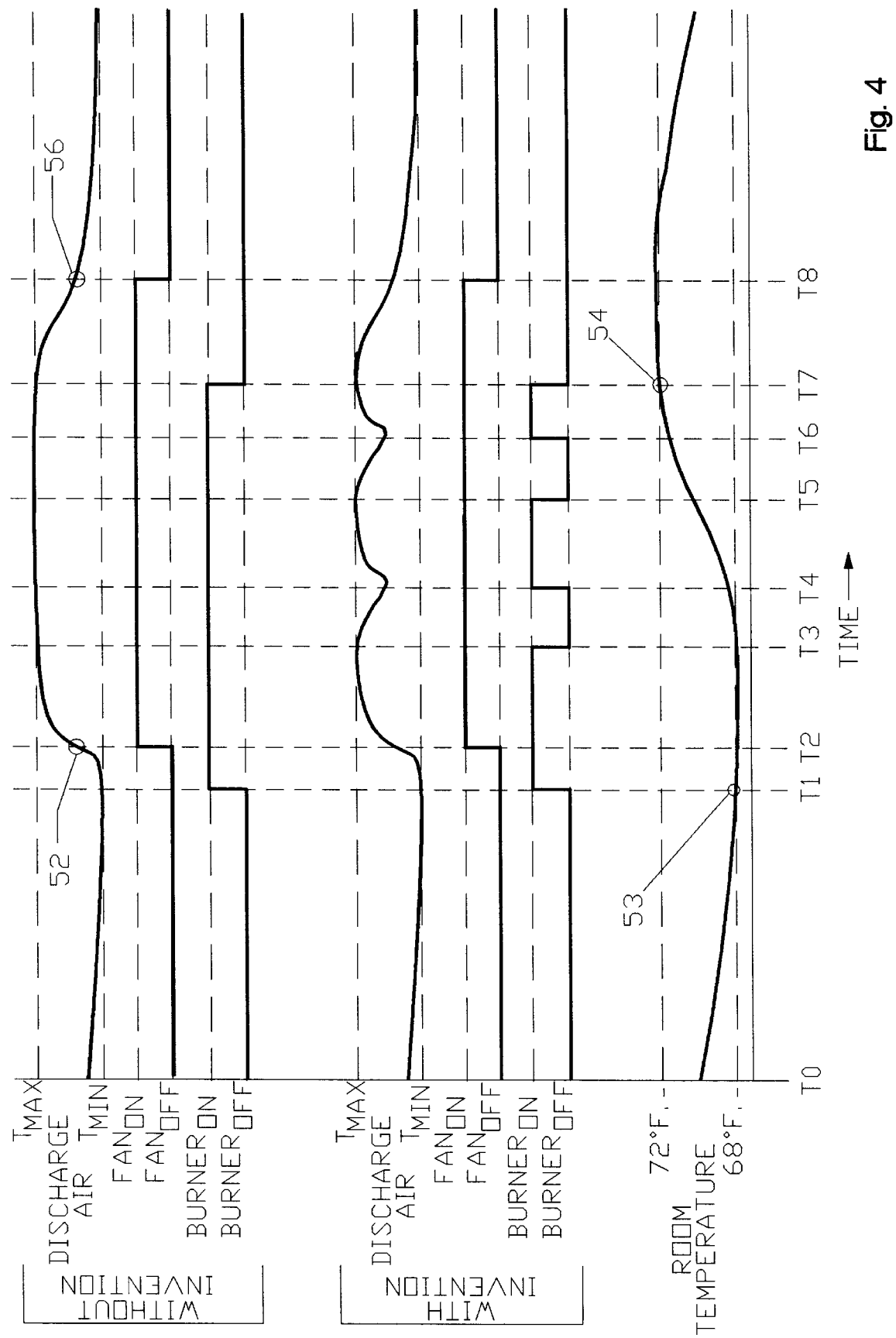
FIG. 4 is a superimposition of three graphs in the same time showing heating system responses with and without the invention.

Conventionally, an electrical source 34, which is preferably low voltage, is powered through a space energy sensor, such as room thermostat 36, which monitors the temperature of the room 6 as indicated in FIG. 4 bottom graph. Generally, the thermostat allows a certain hysteresis between, for example a burner turn-on temperature of 68° (53 in FIG. 4), and a burner shut-off temperature of 72° (54 in FIG. 4).

Returning to FIG. 1, when the space temperature is within the burner firing range (FIG. 4, bottom graph between $T_1$ and $T_7$), conductor 38 and 40 provide power to burner 24. Air intakes through vent 42 to fire box 44, where it supports the combustion of burner 24. The exhaust gases exit up a flue 46 and out chimney 48.

Flame 50 heats air 20 and heat exchanger 22 until air 20 reaches a minimum fan turn-on temperature 52, as shown in FIG. 4. This avoids pumping drafts of cold air about space 6 before heat exchanger 22 has been sufficiently warmed to provide warm comfortable air. Once the heat exchanger has reached a sufficient fan-on temperature (52 in FIG. 4), thermostat 18 (FIG. 1) provides power from source 58, and closes the circuit to actuate fan 16, which drives air 26 through output duct 28, where it is vented as warm air 32 into space 6.

As long (FIG. 4, top graph between $T_2$ and $T_8$) as the heat exchanger air temperature, measured by sensor 18, remains above a minimum fan shut-off temperature (FIG. 4, top graph at 56), the fan will remain running. The burner continues to fire until room 6 (FIG. 1) temperature is at the thermostat maximum 54 (FIG. 4), at which point thermostat 36 (FIG. 1) interrupts the flow from power source 34 to burner 24, so that flame 50 is extinguished. However, heat exchanger 22 remains hot, and so fan 16 continues to run until the temperature sensed by sensor 18 falls below a minimum fan operation temperature as shown in FIG. 4 at 56.

Invention

The present invention comprises a control box 62, interposed between conductors 38 and 40, connected to output air temperature sensor 64, which senses the temperature of air 26 as it exits the heat exchanger. A power source 66 and a ground 68 complete the connections toward 62.

As shown in FIG. 4, in the graph labeled WITHOUT INVENTION, a call from thermostat 36 immediately causes the burner to turn on. - Output air (26 in FIG. 1) begins heating slightly through convection until heat exchanger temperature sensor 18 reaches its fan turn-on temperature, at which point fan 16 goes from a off to an on state at T2 (FIG. 4). The temperature of the output or discharge air begins to rise, but eventually at T3 approaches a plateau, beyond which it does not heat. This is the thermal maximum at which the heat of the heat exchanger has saturated the ability of the air passing through it to absorb heat. Thus, during the entire time T3 to T7, burner 24 of FIG. 1 is producing heat, raising the temperature of the heat exchanger beyond the point at which it can increase the temperature of the air flowing past it. This is a waste of energy. Fuel is being expended without any commensurate gain in the temperature of air 20, 26, or 32 (FIG. 1).

As shown in FIG. 4, in the graph labeled WITH INVENTION, output air temperature sensor 64 (shown in FIG. 1) monitors the temperature of the discharge air 26. In FIG. 4, WITH INVENTION, the burner turns on at Ti and remains on through T2, at which time the fan turns on, raising the temperature on the discharge air. Before T3, the discharge air reaches a $T_{max}$. The $T_{max}$ can be determined by prior calibration or preferably by:

making a plurality of measurements of a temperature of air output from the heat exchanger;

recording a first start time T1, at which the burner turns on;

observing the temperature measurement after the burner has turned on;

initializing a confirmation interval when two or more consecutive temperatures at sensor 64's measurements of the discharge air are substantially the same; and observing the discharge air temperature measurement either during or at the end of confirmation interval T3.

If during, the confirmation interval, the temperature rises, the system will go back to observing consecutive temperature measurements until two or more are the same.

If the observation is taken at the end of the confirmation interval and it is not the same, the confirmation interval will again be de-initialized and consecutive observations will continue to be made.

If the temperature has remained at plateau of $T_{max}$ for the duration of the confirmation interval, the burner is shut off at T3. Thus, the burner no longer attempts to heat heat exchanger 22 past its maximum thermal transfer capacity. Thus, fuel is being saved for the entire interrupt interval between T3–T4.

The cycle repeats itself through interrupt interval T5 to T6, and again through interrupt interval T7 to T8, by which time room 6 temperature has exceeded the maximum temperature at which the thermostat burner call is made 54 in FIG. 4, and thermostat 36 ends its burner call. This cycle will occur repeatedly with each burner call.

It is desirable to limit the temperature fall of the discharge air in order to keep the fan on and to maintain a useful heat output, typically 110 degrees F.

It is therefore helpful to calibrate the control box 64 to inform it at what temperature of output air energy sensor 64, fan 16 shuts off. To so calibrate, an installer:

initiates a burner call by adjusting thermostat 36;
 waits for heat exchanger 22 to sufficiently heat to cause fan 16 to turn on;
 waits for the burner call to end;
 waits for the temperature of heat exchanger 22 to fall sufficiently to reach fan 16 turn-off temperature at thermostat 18;
 presses calibration button 70 on control box 62;
 thereby calibrates the box by inputting the output air energy sensor value corresponding to the output air 26 temperature when fan 16 turns off.

Having thus calibrated fan turn off temperature 56 of FIG. 4, it is possible to keep the discharge air temperature above $T_{min}$ by restarting the burner at T4, when the discharge air temperature is about midway between $T_{max}$ and $T_{min}$.

However, the preferred method of the present invention is to measure the thermal inertia of the heat exchanger between T2 and T3, and thereby extrapolate then to stop the burner interrupt at T4.

We will define this time between T2 and T3 as the elapsed time. Elapsed time may begin to be counted at any time after T1, but it is preferred to start the elapsed time at T2, since the fan turn-on creates a more linear relationship between temperature increase and heat exchanger thermal inertia, between T2 and T3, which is more reproducible and more independent of any external influences. Thus, in claim 1, line 5, claiming "recording a first start time at a time when the burner turns on" uses the dictionary definition of "at" as "on or near". We hereby define "near" as extending at least to the time of fan turn-on and being preferably substantially coincident with the fan turn-on. Of course, where the fan is always on, "at" will be some interval on or near the burner turn-on. The more thermal inertia that the heat exchanger 22 has, the longer it will take for discharge air temperature after T3 to approach $T_{min}$.

This interval is remarkably independent of the thermal load on room 6. The turn-off intervals T3–T4 and T5–T6 can be remarkably reproducible without further reference to discharge air temperature. Once this elapsed time T2–T3 is known, T3–T4 will be remarkably consistent to T5–T6 even if T5–T6 is taken as a percentage of T4–T5.

Thus, the burner interrupt interval can be calibrated either at each cycle or at each burner call.

Interupt interval T3–T4 is therefore desirably a function of the elapsed time from T2 to T3. Preferably, the function is a percentage of the elapsed time. Optimally, the function is optimized at a critical value of 20%.

Alternatively, the interupt interval may be controlled through temperature measurement, at which the discharge temperature $T_p=25$—the square root of the elapsed time in seconds. $T_p$ is measured in degrees fahrenheit. The minimum $T_p$ is greater than or equal to zero.

As a third alternative, once the fan shut-off temperature has been recorded, a temperature margin can be added to the fan shut-off temperature and the sum of the temperature margin and the fan shut-off temperature is an interupt interval termination temperature.

Figure 2:
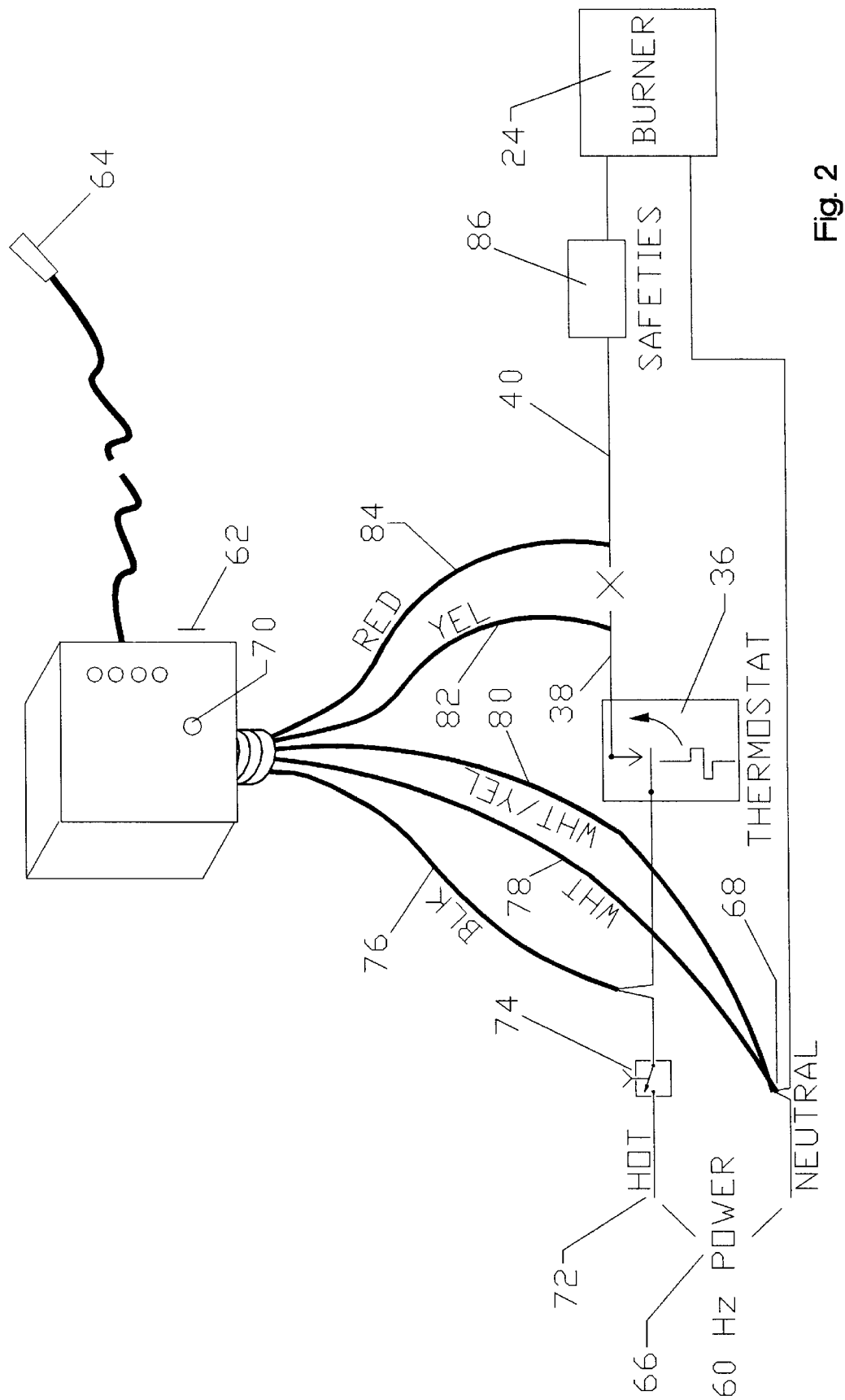
FIG. 2 is a wiring diagram showing the invention installed in the wiring of a heating system.

Thus, if the output air temperature, during an interupt interval, is less than the interupt interval termination temperature, the invention ends the interupt interval. - FIG. 2 shows how to wire the invention 62 into a typical furnace burner circuit. 60 Hz Power 66 is supplied through the hot lead 72, through master furnace switch 74, on the switched side of which is connected black wire 76, which connects to control box 62 and provides hot power thereto.

White 78 and white/yellow 80 leads are attached to power neutral line at connection 68. On the other side from black 76 of thermostat 36, lead 38 is broken and lead 38 is connected to yellow wire 82, from which it returns as red wire 84, and is connected to lead 40, through burner safety 86, to burner 24.

Figure 3:
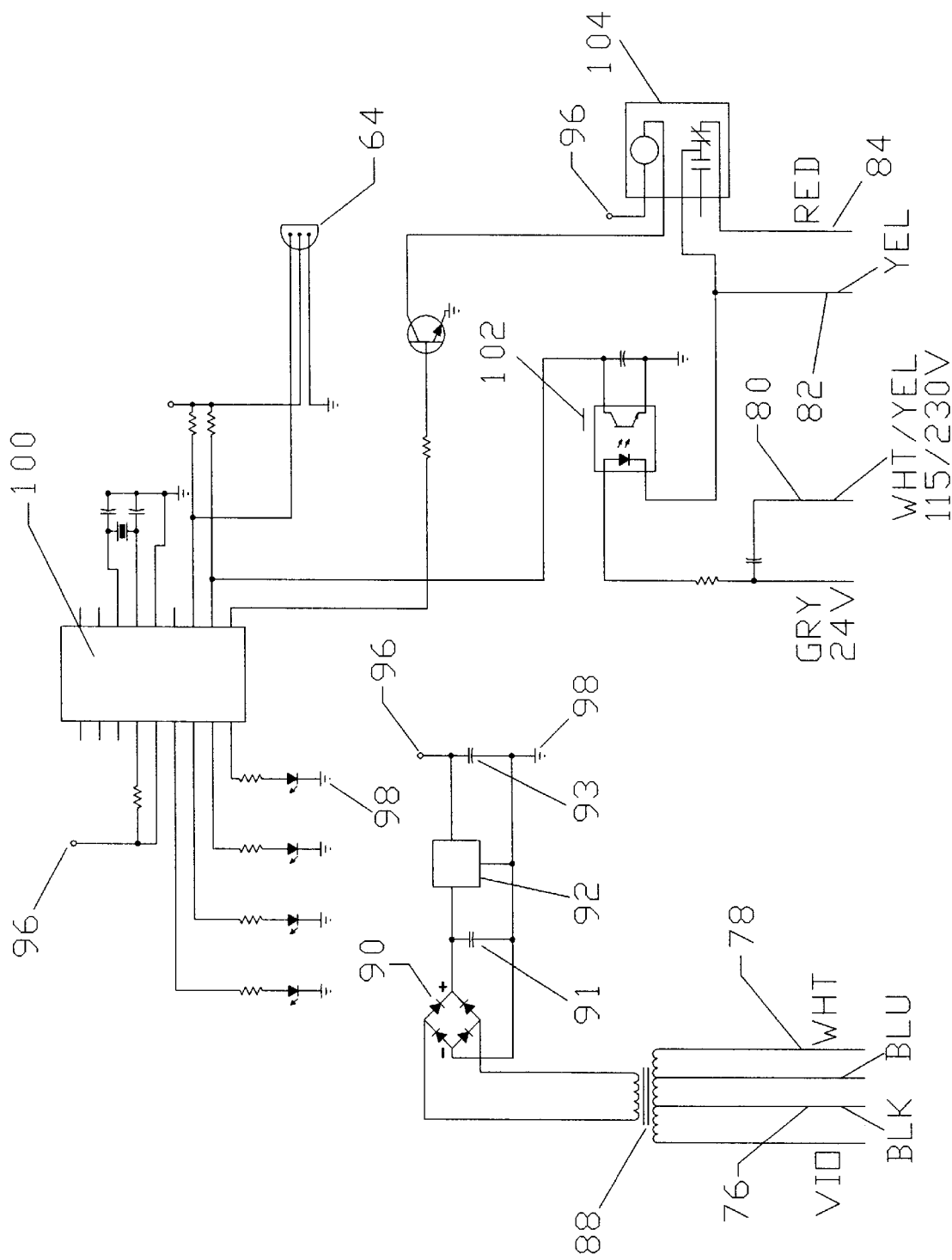
FIG. 3 is an electronic schematic of the control box of the invention.

FIG. 3 shows the circuit inside control box 62. Power is supplied on the hot side by black wire 76, and on the neutral side by white wire 78. These are transformed at transformer 88, and rectified by ring diodes 90, where they are transmitted through power regulating elements 91, 92, and 93, to the output as control box power supply at points 96, which is 5 volts plus, and 98 which is ground. Processor 100, preferably a microprocessor, in this case a 16C556, but which may be any functional equivalent, receives input from temperature sensor 64. White/yellow wire 80 provides 230, 115 or 24 volt power to isolator 102, which provides a sensor that can signal a wide range of voltage inputs, to handle many various voltages that are often used on thermostats. Typically this varies, with voltages between 12 volts and 0.240 volts. Switching circuit 104 responds to the commands of microprocessor 100, as described above, to switch on and off the continuity between thermostatically switched power supply yellow wire 82 and red wire 84.

Having thus described my invention

I claim:

1. A method of regulating cycles in a forced air heating system having a burner, a heat exchanger, and a fan, said method comprising the steps of:

making a plurality of measurements of a temperature of air output from the heat exchanger;
 observing a temperature measurement of the plurality, after the burner has turned on;
 initializing a confirmation interval when two consecutive temperature measurements of the plurality are substantially the same;
 observing a temperature measurement of the plurality at an end of the confirmation interval;
 if the temperature measurement at the end of the confirmation interval is substantially the same as the two consecutive temperature measurements:
  recording said same temperature measurement as a steady state temperature; and
  interrupting firing of the burner for an interrupt interval;
 said interrupt interval being insufficient to allow the heat exchanger's temperature to fall below a useful value.

2. A method according to claim 1 in which the interrupt interval is determined by the steps of:

recording a first start time;
 recording a first stop time; and
 determining an elapsed time from the first start time to the first stop time;
 said interrupt interval being a function of the elapsed time from the first start time to the first stop time.

3. A method according to claim 2 in which the first start time is at or after turning on of the burner.

4. A method according to claim 3 in which the first start time is at turning on of the fan.

5. A method according to claim 1 wherein, if the temperature measurement at the end of the confirmation interval is substantially different from the two consecutive temperature measurements:
   further observing temperature measurements of the plurality;
   initializing a confirmation interval when two consecutive temperature measurements of the plurality are substantially the same;
   observing a temperature measurement of the plurality at an end of the confirmation interval;
   if the temperature measurement at the end of the confirmation interval is substantially the same as the two consecutive temperature measurements:
      recording a first stop time,
      determining an elapsed time from the first start time to the first stop time,
      recording said same temperature measurement as a steady state temperature,
      interrupting firing of the burner for an interrupt interval;
      said interrupt interval being a function of the elapsed time from the first start time to the first stop time.

6. A method according to claim 1, which, after the interrupt interval, further comprises the steps of:
   recording a new first start time at a new time when the burner turns on;
   initializing a new confirmation interval when a new two consecutive temperature measurements of the plurality are substantially the same;
   observing a new temperature measurement of the plurality at an end of the new confirmation interval;
   if the new temperature measurement at the end of the new confirmation interval is substantially the same as the new two consecutive temperature measurements:
      recording a new first stop time,
      determining a new elapsed time from the new first start time to the new first stop time,
      recording said same new temperature measurement as a new steady state temperature,
      interrupting firing of the burner for a new interrupt interval;
      said new interrupt interval being the function of the new elapsed time from the new first start time to the new first stop time.

7. A method according to claim 6 wherein, if the temperature measurement at the end of the confirmation interval is substantially different from the two consecutive temperature measurements:
   further observing temperature measurements of the plurality;
   initializing a confirmation interval when two consecutive temperature measurements of the plurality are substantially the same;
   observing a temperature measurement of the plurality at an end of the confirmation interval;
   if the temperature measurement at the end of the confirmation interval is substantially the same as the two consecutive temperature measurements:
      recording a first stop time,
      determining an elapsed time from the first start time to the first stop time,
      recording said same temperature measurement as a steady state temperature,
      interrupting firing of the burner for an interrupt interval;
      said interrupt interval being a function of the elapsed time from the first start time to the first stop time.

8. A method according to claim 1 in which the function is a percentage of the elapsed time.

9. A method according to claim 8 in which the percentage is optimized at substantially 20%.

10. A method according to claim 1 in which the function is a temperature value derived from the elapsed time.

11. A method according to claim 10 in which the temperature value is preferably:

$$0 \to = T_p = 25 - L_t^{1/2}$$

where:
   $T_p$ is the preferred temperature value in degrees Fahrenheight, and
   $L_t$ is the elapsed time in seconds.

12. A method according to claim 1 comprising the further steps of:
   determining an air output temperature at which a circulating fan shuts off to define a fan shut-off temperature;
   recording said fan shut-off temperature;
   adding a temperature margin to the fan shut-off temperature, the sum of which is an interrupt interval termination temperature.

13. A method according to claim 12 in which, if
   an output air temperature, during the interrupt interval, is less than the interrupt interval termination temperature,
   then
   ending the interrupt interval.

14. Apparatus for regulating burner run cycles in a forced air heating system, said apparatus comprising:
   sensor means for measuring temperature of air output from a heat exchanger;
   electronic circuit means for:
      recording a first start time at a time when the burner turns on;
      monitoring the sensor means;
      initializing a confirmation interval when two consecutive temperature measurements of the plurality are substantially the same;
      observing a temperature measurement at an end of the confirmation interval;
      if the temperature measurement at the end of the confirmation interval is substantially the same as the two consecutive temperature measurements:
         recording a first stop time,
         determining an elapsed time from the first start time to the first stop time,
         recording said same temperature measurement as a steady state temperature,
         interrupting firing of the burner for an interrupt interval.

15. In a forced air heating system having:
   a burner;
   a heat exchanger;
   a heat exchanger air output;
   a space energy value sensor;
   a heat exchanger energy value sensor;
   a circulating air pump;
   an improvement comprising:
      sensor means for measuring temperature of air output from a heat exchanger;

electronic circuit means for:
  recording a first start time at a time when the burner turns on;
  monitoring the sensor means;
  initializing a confirmation interval when two consecutive temperature measurements of the plurality are substantially the same;
  observing a temperature measurement at an end of the confirmation interval;
  if the temperature measurement at the end of the confirmation interval is substantially the same as the two consecutive temperature measurements:
    recording a first stop time,
    determining an elapsed time from the first start time to the first stop time,
    recording said same temperature measurement as a steady state temperature,
    interrupting firing of the burner for an interrupt interval.

16. Apparatus according to claim 15 in which the improvement serves as a means for decreasing burner run time per a duration of a call by the space energy value sensor, thereby reducing fuel use.

17. In a heating system according to claim 15 further having the burner controlled by means for conducting from the space energy value sensor;
the improvement further comprising:
  means for sensing a signal from the space energy value sensor; and
  a switched break in the conducting means controlled by the electronic circuit means.

18. Apparatus according to claim 15 in which the signal sensing means is an apparatus with a wide range of voltage inputs.

19. Apparatus according to claim 18 in which the wide range of voltage inputs is between 24 VAC and 240 VAC.

20. Apparatus according to claim 19 in which the signal sensing means includes an optoisolator.

21. Apparatus according to claim 15 in which the electronic circuit means comprises a microprocessor.

* * * * *